(12) United States Patent
Palanki et al.

(10) Patent No.: US 8,675,693 B2
(45) Date of Patent: Mar. 18, 2014

(54) ITERATIVE DECODING WITH CONFIGURABLE NUMBER OF ITERATIONS

(75) Inventors: Ravi Palanki, San Diego, CA (US); Hemanth Sampath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1132 days.

(21) Appl. No.: 12/430,629

(22) Filed: Apr. 27, 2009

(65) Prior Publication Data

US 2010/0272011 A1 Oct. 28, 2010

(51) Int. Cl.
H04J 99/00 (2009.01)

(52) U.S. Cl.
USPC ............ 370/546; 370/279; 370/203; 370/332

(58) Field of Classification Search
USPC .......... 370/328, 529, 235, 546, 332, 279, 203
See application file for complete search history.

(56) References Cited

U.S. PATENT DOCUMENTS

| | | | | |
|---|---|---|---|---|
| 6,126,310 A * | 10/2000 | Osthoff et al. | ................ | 714/751 |
| 6,526,531 B1 * | 2/2003 | Wang | ............................. | 714/704 |
| 6,625,179 B1 * | 9/2003 | Doetsch et al. | ............... | 370/529 |
| 6,988,233 B2 * | 1/2006 | Kanai et al. | .................... | 714/755 |
| 7,093,180 B2 | 8/2006 | Shin et al. | | |
| 7,370,332 B2 * | 5/2008 | Kutz et al. | ..................... | 714/780 |
| 7,508,805 B2 | 3/2009 | Choi et al. | | |
| 7,590,914 B2 * | 9/2009 | Kim et al. | ..................... | 714/752 |
| 7,782,852 B2 * | 8/2010 | Tellado et al. | ................ | 370/391 |
| 7,783,958 B1 * | 8/2010 | Eidson et al. | ................. | 714/780 |
| 7,853,857 B2 * | 12/2010 | Buckley et al. | ............... | 714/781 |
| 8,006,172 B2 * | 8/2011 | Boyer et al. | ................... | 714/786 |
| 8,024,644 B2 * | 9/2011 | Shen | .............................. | 714/774 |
| 8,139,512 B2 * | 3/2012 | Charbit et al. | ................ | 370/279 |

(Continued)

FOREIGN PATENT DOCUMENTS

| | | |
|---|---|---|
| EP | 0998087 | 5/2000 |
| EP | 1401138 | 3/2004 |
| EP | 1906560 | 4/2008 |
| WO | WO 2007075098 | 7/2007 |

OTHER PUBLICATIONS

International Search Report and Written Opinion—PCT/US2010/032103, International Search Authority—European Patent Office—Oct. 13, 2010.
Taiwan Search Report—TW099112956—TIPO—Apr. 22, 2013.

*Primary Examiner* — Ricky Ngo
*Assistant Examiner* — Dewanda Samuel
(74) *Attorney, Agent, or Firm* — Abdollah Katbab (57) ABSTRACT

Techniques for transmitting and receiving data in a communication system are described. A receiver may iteratively decode a data packet and may obtain better performance with more decoding iterations. The receiver may select the number of decoding iterations based on at least one parameter (e.g., packet size) to tradeoff between decoder throughput and link performance. In one design, a transmitter may obtain a transport format selected based on the number of decoding iterations, process a data packet in accordance with the transport format, and send a transmission of the data packet to the receiver. The receiver may receive the transmission of the data packet and may perform decoding for the data packet for up to the selected number of decoding iterations. The transport format and/or CQI information may be determined based on an expected degradation in link performance due to the receiver performing the selected number of decoding iterations.

21 Claims, 5 Drawing Sheets

(56) References Cited

U.S. PATENT DOCUMENTS

| | | | |
|---|---|---|---|
| 8,151,171 B2* | 4/2012 | Blanksby | 714/780 |
| 8,209,579 B2* | 6/2012 | Belogolovy | 714/752 |
| 8,209,581 B2* | 6/2012 | Yokokawa et al. | 714/752 |
| 2004/0199848 A1* | 10/2004 | Tamesue et al. | 714/758 |
| 2005/0003782 A1 | 1/2005 | Wintzell | |
| 2005/0053040 A1* | 3/2005 | Choi et al. | 370/335 |
| 2005/0204271 A1* | 9/2005 | Sharon et al. | 714/801 |
| 2005/0204272 A1* | 9/2005 | Yamagishi | 714/801 |
| 2006/0107193 A1* | 5/2006 | Park et al. | 714/801 |
| 2007/0139229 A1 | 6/2007 | Berens | |
| 2009/0003301 A1* | 1/2009 | Reial et al. | 370/342 |
| 2009/0249163 A1* | 10/2009 | Ovchinnikov et al. | 714/755 |

* cited by examiner

ITERATIVE DECODING WITH CONFIGURABLE NUMBER OF ITERATIONS

BACKGROUND

I. Field

The present disclosure relates generally to communication, and more specifically to techniques for transmitting and receiving data in a communication system.

II. Background

In a communication system, a transmitter may encode a packet of data to obtain code bits, interleave the code bits, and map the interleaved bits to modulation symbols. The transmitter may then process and transmit the modulation symbols via a communication channel. The communication channel may distort the data transmission with a particular channel response and may further degrade the data transmission with noise and interference. A receiver may obtain received symbols, which may be distorted and degraded versions of the transmitted symbols. The receiver may process the received symbols to recover the data packet.

The encoding by the transmitter may allow the receiver to reliably recover the data packet based on the degraded received symbols. The transmitter may perform encoding based on a forward error correction (FEC) code that generates redundancy in the code bits. The receiver may utilize the redundancy to improve the likelihood of recovering the data packet.

Newer communication systems may support very high data rates and may also use low latency or delay. A receiver in such a communication system may need to process a large amount of data in a short amount of time. Since decoding is typically a computationally intensive operation, the receiver may use a large amount of processing power in order to meet high data rate and low latency specifications. A high throughput decoder that can process a large amount of data with short delay may be highly desirable.

SUMMARY

Techniques for transmitting and receiving data in a communication system are described herein. A receiver may iteratively decode a data packet and may obtain better performance (e.g., higher likelihood of recovering the data packet) with more decoding iterations. In an aspect, the number of decoding iterations may be selected based on a tradeoff between decoder throughput and link performance. In general, the receiver may perform fewer decoding iterations if it is receiving a large amount of data and may perform more decoding iterations if it is receiving a small amount of data. This may be beneficial since the receiver may observe good signal-to-noise ratio (SNR) conditions when receiving data at a high data rate, and some degradation in link performance due to fewer decoding iterations may be acceptable. Conversely, the receiver may observe poor SNR conditions when receiving data at a low data rate and may then perform more decoding iterations to improve link performance.

In one design, a transmitter may obtain a transport format selected based on the number of decoding iterations to be performed by a receiver. The transmitter may process a data packet in accordance with the transport format and may send a transmission of the data packet to the receiver. In one design, the receiver may receive the transmission of the data packet from the transmitter and may perform decoding for the data packet for up to the selected number of decoding iterations. The receiver may select the number of decoding iterations based on at least one parameter, e.g., packet size.

In one design, the receiver may be part of a user equipment (UE). The UE may determine channel quality indicator (CQI) information based on the selected number of decoding iterations, e.g., determine CQI information by taking into account an expected degradation in link performance due to the UE performing the selected number of decoding iterations. The UE may send the CQI information to a base station. The base station may select a transport format based on the CQI information and may send a transmission of the data packet in accordance with the transport format to the UE.

In another design, the receiver may be part of a base station. The base station may select a transport format based on the selected number of decoding iterations, e.g., select a transport format by taking into account an expected degradation in link performance due to the base station performing the selected number of decoding iterations. The base station may send the transport format to a UE. The UE may send a transmission of the data packet in accordance with the transport format to the base station.

Various aspects and features of the disclosure are described in further detail below.

DETAILED DESCRIPTION

The techniques described herein may be used for various applications such as communication, computing, networking, etc. The techniques may also be used for various communication systems including wireless communication systems, wireline communication systems, etc. For example, the techniques may be used for wireless communication systems such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies.

The techniques described herein may be used for a UE as well as a base station. A UE may also be referred to as a mobile station, a terminal, an access terminal, a subscriber unit, a station, etc. A UE may be a cellular phone, a personal digital assistant (PDA), a wireless communication device, a wireless modem, a handheld device, a laptop computer, a cordless phone, a wireless local loop (WLL) station, etc. A base station may also be referred to as a Node B, an evolved Node B (eNB), an access point, etc.

Figure 1:
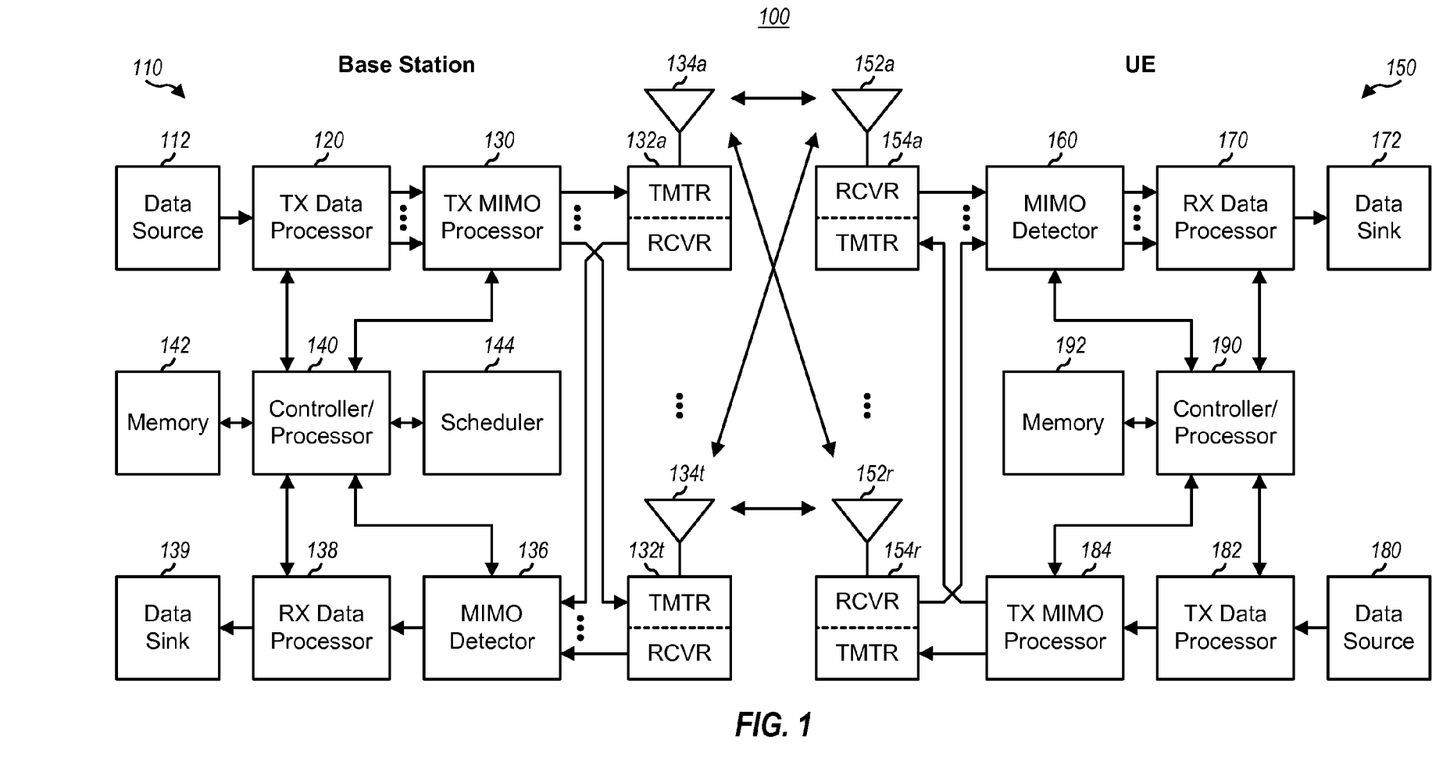
FIG. 1 shows a block diagram of a base station and a UE.

FIG. 1 shows a block diagram of a design of a base station 110 and a UE 150 in a wireless communication system. Base station 110 may be equipped with T antennas 134a through 134t, and UE 150 may be equipped with R antennas 152a through 152r, where in general $T \geq 1$ and $R \geq 1$.

At base station 110, a transmit (TX) data processor 120 may receive packets of data from a data source 112, process (e.g., format, encode, interleave, and symbol map) each data packet based on a transport format, and provide data symbols for all data packets. A data packet may also be referred to as a packet, a transport block, a data block, a subpacket, etc. A transport format may indicate a packet size, a coding scheme, a code rate, a modulation scheme or format, etc. A transport format may also be referred to as a packet format, a modulation and coding scheme (MCS), a rate, etc. Processor 120 may also receive control information (e.g., for resource grants) from a controller/processor 140, process the control information, and provide control symbols. A TX multiple-input multiple-output (MIMO) processor 130 may multiplex the data symbols and the control symbols with pilot symbols, perform precoding on the symbols if applicable, and provide T output symbol streams to T transmitters (TMTR) 132a through 132t. Each transmitter 132 may process its output symbol stream (e.g., for OFDM, SC-FDM, CDMA, etc.) to obtain an output sample stream. Each transmitter 132 may further condition (e.g., convert to analog, filter, amplify, and upconvert) its output sample stream and generate a downlink signal. T downlink signals from transmitters 132a through 132t may be transmitted from T antennas 134a through 134t, respectively.

At UE 150, R antennas 152a through 152r may receive the downlink signals from base station 110, and each antenna 152 may provide a received signal to a respective receiver (RCVR) 154. Each receiver 154 may process (e.g., filter, amplify, downconvert, and digitize) its received signal to obtain input samples and may further process the input samples (e.g., for OFDM, SC-FDM, CDMA, etc.) to obtain received symbols. A MIMO detector 160 may obtain received symbols from all R receivers 154a through 154r, perform MIMO detection on the received symbols if applicable, and provide detected symbols. A receive (RX) data processor 170 may further process (e.g., symbol demap, deinterleave, and decode) the detected symbols, provide decoded data packets to a data sink 172, and provide decoded control information to a controller/processor 190. In general, the processing by MIMO detector 160 and RX data processor 170 at UE 150 may be complementary to the processing by TX MIMO processor 130 and TX data processor 120 at base station 110.

UE 150 may evaluate downlink channel conditions and determine CQI information indicative of the downlink channel quality. UE 150 may send feedback information to base station 110. The feedback information may comprise the CQI information, acknowledgement (ACK) information for the data packets received by UE 150, and/or other information. The feedback information and data packets from a data source 180 may be processed by a TX data processor 182, multiplexed with pilot symbols and processed by a TX MIMO processor 184, and further processed by transmitters 154a through 154r to generate R uplink signals, which may be transmitted via antennas 152a through 152r.

At base station 110, the uplink signals from UE 150 may be received by T antennas 134a through 134t, processed by receivers 132a through 132t, detected by a MIMO detector 136, and further processed by an RX data processor 138 to recover the feedback information and data packets sent by UE 150. Controller/processor 140 may control data transmission to/from UE 150 based on the feedback information.

Controllers/processors 140 and 190 may direct the operation at base station 110 and UE 150, respectively. Memories 142 and 192 may store data and program codes for base station 110 and UE 150, respectively. A scheduler 144 may schedule UEs for data transmission on the downlink and/or uplink and may provide resource grants for the scheduled UEs.

The system may support hybrid automatic retransmission (HARQ) in order to improve reliability of data transmission. For HARQ, a transmitter may send a transmission of a data packet and may send one or more additional transmissions of the data packet, if needed, until the data packet is decoded correctly by a receiver, or the maximum number of transmissions has been sent, or some other termination condition is encountered. Each transmission of the data packet may be referred to as an HARQ transmission. The HARQ transmissions for the data packet may be assigned sequential HARQ transmission indices 1, 2, 3, etc.

TX data processors 120 and 182 in FIG. 1 may encode data packets based on various FEC codes. Some commonly used FEC codes include Turbo code, LDPC code, and convolutional code. For simplicity, much of the description below covers Turbo code and LDPC code. The techniques described herein may be used with Turbo code, LDPC code, and other codes such as convolutional code.

Figures 2, 3:
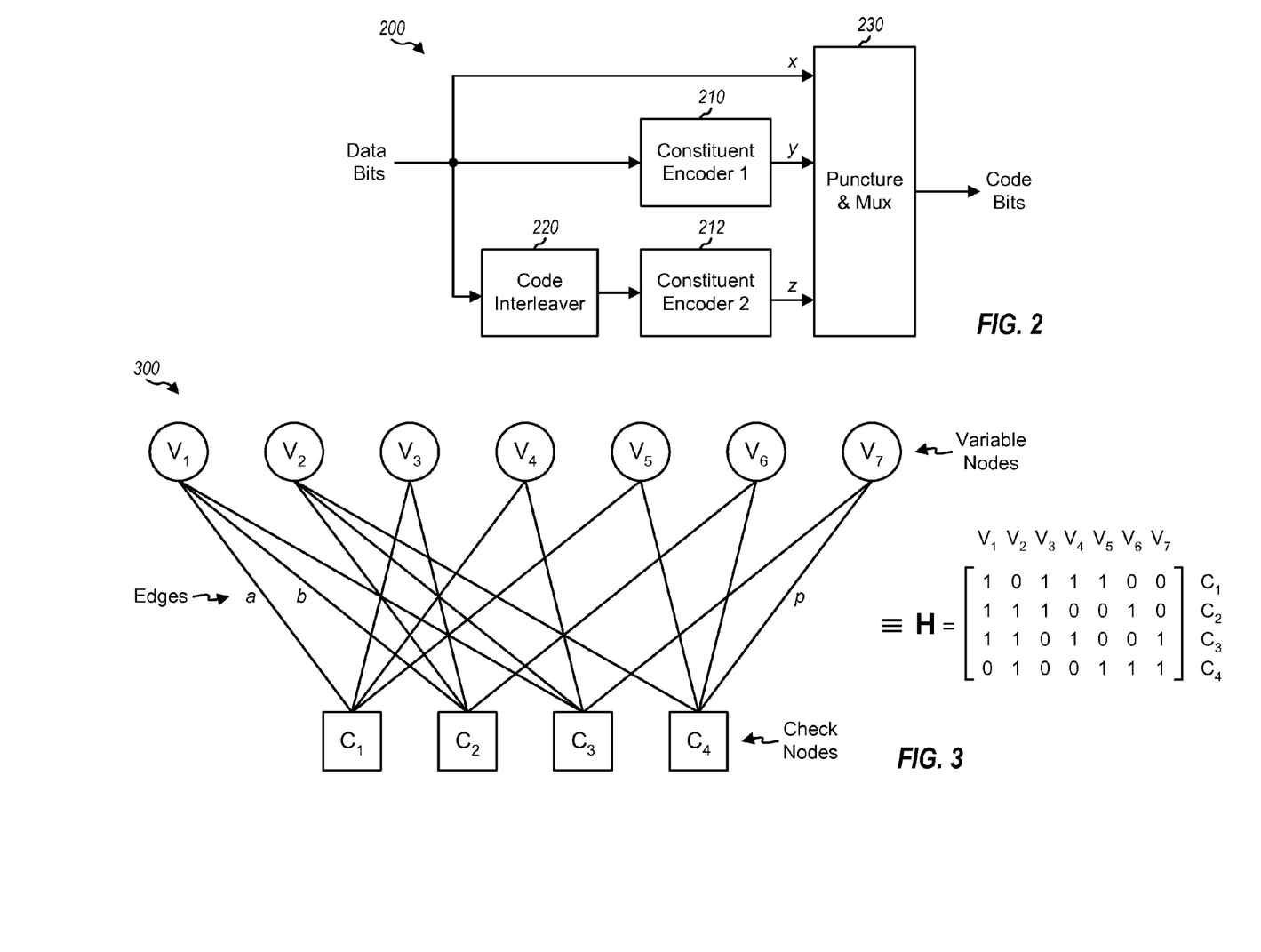
FIG. 2 shows a block diagram of a Turbo encoder.
FIG. 3 shows a Tanner graph for a low density parity check (LDPC) code.

FIG. 2 shows a block diagram of a design of a Turbo encoder 200, which may be used for TX data processors 120 and 182 in FIG. 1. Turbo encoder 200 implements a parallel concatenated convolutional code (PCCC) and includes two constituent encoders 210 and 212, a code interleaver 220, and a puncture and multiplex (Mux) unit 230. Turbo encoder 200 encodes a data packet and provides a coded packet.

Within Turbo encoder 200, code interleaver 220 may receive and reorder the data bits (denoted as x) in the data packet based on a Turbo interleaver. Constituent encoder 210 may encode the data bits based on a first constituent code and provide first parity bits (denoted as y). Similarly, constituent encoder 212 may encode the interleaved data bits from code interleaver 220 based on a second constituent code and provide second parity bits (denoted as z). Constituent encoders 210 and 212 may implement two recursive systematic constituent codes, which may be convolutional codes. Unit 230 may receive the data bits and the parity bits from constituent encoders 210 and 212 and may puncture or delete a sufficient number of bits based on a selected code rate to obtain the desired number of bits. Unit 230 may multiplex the undeleted data bits and parity bits and may provide the multiplexed bits as code bits for the coded packet. The code bits may include the data bits (which are also referred to as systematic bits), followed by the first parity bits, and then followed by the second parity bits.

An LDPC code may be defined by a sparse parity check matrix having relatively few non-zero elements and mostly zero elements. The parity check matrix defines a set of linear constraints on code bits and may be represented in the form of a Tanner graph.

FIG. 3 shows a Tanner graph 300 for an exemplary LDPC code. In this example, Tanner graph 300 includes seven variable nodes $V_1$ through $V_7$ represented by seven circles and four check nodes $C_1$ through $C_4$ represented by four squares. Each variable node represents a code bit, which may be either transmitted or punctured. The seven code bits for variable nodes $V_1$ through $V_7$ form a codeword or coded packet. Each check node represents a constraint, and the four check nodes $C_1$ through $C_4$ represent four constraints that define the LDPC code. The variable nodes are connected to the check nodes via edges. In this example, 16 edges a through p connect the seven variable nodes to the four check nodes. For each check node, all code bits from the variable nodes connected to that check node are constrained to sum to 0 (modulo-2).

FIG. 3 also shows an exemplary parity check matrix H corresponding to Tanner graph 300. In this example, H includes seven columns for the seven variable nodes $V_1$ through $V_7$ and four rows for the four check nodes $C_1$ through $C_4$. Each column of H includes a '1' element for each check node connected to the variable node corresponding to that column. For example, the first column includes three '1's in rows 1, 2 and 3 for the three check nodes $C_1$, $C_2$ and $C_3$ connected to the corresponding variable node $V_1$. Each remaining column of H includes two or three '1's for two or three check nodes connected to the corresponding variable node.

In general, an LDPC code may be defined by an M×N parity check matrix H with M rows for M check nodes and N columns for N variable nodes, where M>1 and N>M. M is also the number of data bits, and N is also the number of code bits. The constraints for the LDPC code may be expressed in matrix form as:

$$0 = Hx, \quad \text{Eq (1)}$$

where
  x is an N×1 vector of N code bits for a coded packet or codeword, and
  0 is a vector of all zeros.

The matrix multiplication in equation (1) uses modulo-2 arithmetic. A codeword is considered as valid if the constraints in equation (1) are satisfied.

The rows of H may be combined and re-arranged to obtain a matrix $[P^T I]$, where I is an identity matrix. An N×M generator matrix G may then be defined as $G = [I P]^T$. A data packet may be encoded based on generator matrix G, as follows:

$$x = Gd, \quad \text{Eq (2)}$$

where d is an M×1 vector of M data bits for the data packet.

Figure 4:
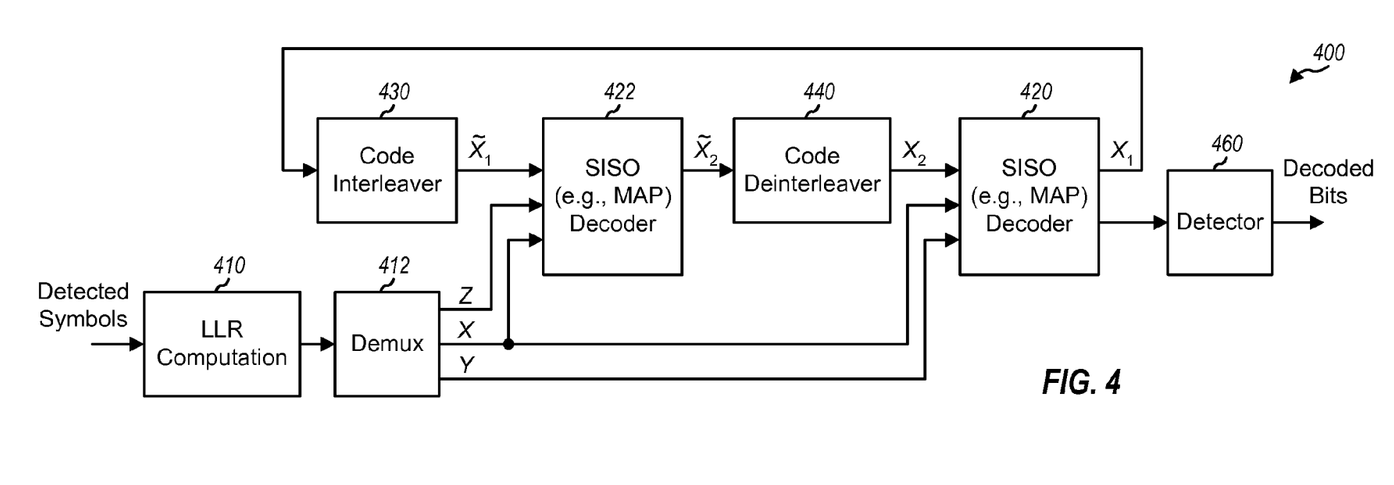
FIG. 4 shows a block diagram of a Turbo decoder.

FIG. 4 shows a block diagram of a design of a Turbo decoder 400, which may be used for RX data processors 138 and 170 in FIG. 1. Within Turbo decoder 400, a log-likelihood ratio (LLR) computation unit 410 may receive detected symbols for a data packet, e.g., from MIMO detector 136 or 160. The detected symbols may be estimates of the transmitted data symbols. Unit 410 may compute LLRs of code bits for each detected symbol. A data symbol may be obtained by mapping B code bits to a complex value in a signal constellation. B LLRs may be computed for the B code bits of the data symbol based on a corresponding detected symbol. The LLR for each code bit may indicate the likelihood of the code bit being zero ('0') or one ('1') given the detected symbol for that code bit.

A demultiplexer (Demux) 412 may receive input LLRs for the data packet from LLR computation unit 410 and may demultiplex the input LLRs into LLRs X for data bits x, LLRs Y for first parity bits y, and LLRs Z for second parity bits z. A soft-input soft-output (SISO) decoder 420 may receive LLRs X and LLRs Y from demultiplexer 410 and deinterleaved data bit LLRs $X_2$ from a code deinterleaver 440. SISO decoder 420 may derive new LLRs $X_1$ for the data bits based on the first constituent code. A code interleaver 430 may interleave LLRs $X_1$ based on the Turbo interleaver used for code interleaver 320 in FIG. 3 and may provide interleaved data bit LLRs $\tilde{X}_1$. A SISO decoder 422 may receive LLRs X and LLRs Z from demultiplexer 410 and LLRs $\tilde{X}_1$ from code interleaver 430. SISO decoder 422 may derive new LLRs $\tilde{X}_2$ for the data bits based on the second constituent code. Code deinterleaver 440 may deinterleave LLRs $\tilde{X}_2$ based on an inverse of the Turbo interleaver and provide LLRs $X_2$.

SISO decoders 420 and 422 may be maximum a posteriori (MAP) decoders that may implement a BCJR MAP algorithm or a lower complexity version. SISO decoders 420 and 422 may also implement a soft-output Viterbi (SOV) algorithm or some other decoding algorithm known in the art.

The decoding by SISO decoders 420 and 422 may be iterated K times, where K may be a configurable value that may be selected as described below. The decoding results may be more reliable after each iteration. After all K decoding iterations are completed, a detector 460 may receive the final data bit LLRs from SISO decoder 420, make a hard decision on each LLR, and provide decoded bits.

Figure 5:
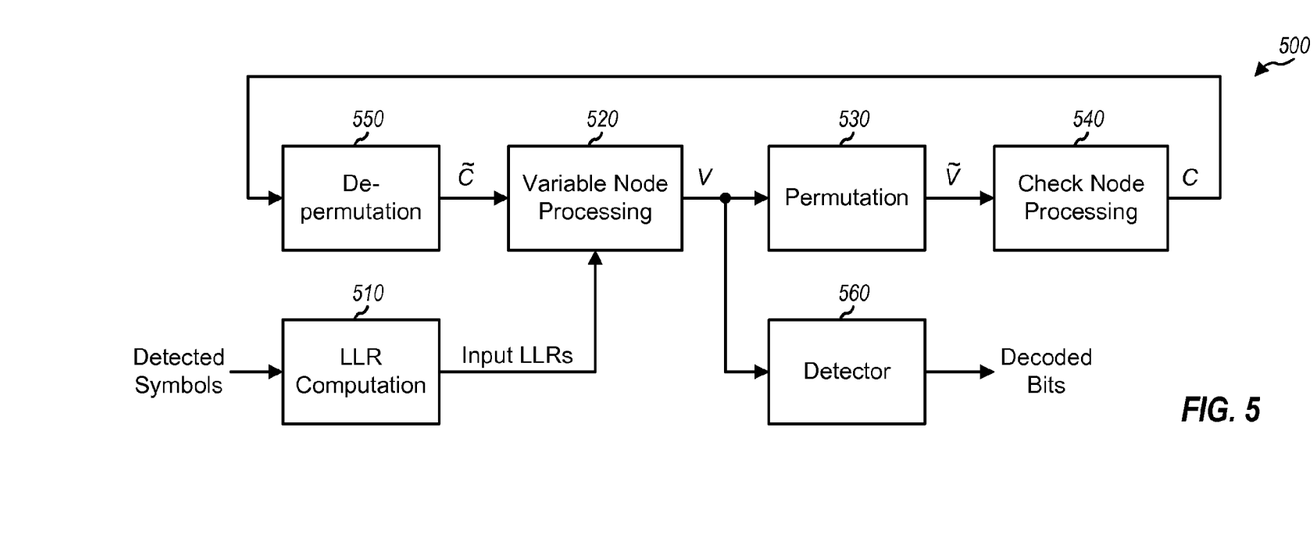
FIG. 5 shows a block diagram of an LDPC decoder.

FIG. 5 shows a block diagram of a design of an LDPC decoder 500, which may also be used for RX data processors 138 and 170 in FIG. 1. Within LDPC decoder 500, an LLR computation unit 510 may receive detected symbols for a data packet and may compute LLRs of code bits for each detected symbol.

A processing unit 520 may receive input LLRs for the data packet from LLR computation unit 410 as well as LLRs $\tilde{C}$ from a de-permutation unit 550 and may compute LLRs V for all N variable nodes based on the received LLRs. A permutation unit 530 may receive LLRs V for the N variable nodes and may provide the LLR for each variable node to appropriate check nodes, as defined by parity check matrix H. A processing unit 540 may receive LLRs $\tilde{V}$ from permutation unit 530 and may compute LLRs C for all M check nodes based on the received LLRs. De-permutation unit 550 may receive LLRs C for the M check nodes and may provide the LLR for each check node to appropriate variable nodes, as also defined by parity check matrix H.

Processing unit 520 may compute LLRs for variable nodes as follows:

$$V_{n,m} = f_v(V_n, C_{m',n}), \quad \text{Eq (3)}$$

where
  $V_{n,m}$ is an LLR from variable node n to check node m,
  $V_n$ is an input LLR for variable node n,
  $C_{m',n}$ is a set of LLRs from all check nodes (except for check node m) connected to variable node n, and
  $f_v$ denotes a decoding function for the variable nodes.

Processing unit 540 may compute LLRs for check nodes as follows:

$$C_{m,n} = f_c(V_{n',m}), \quad \text{Eq (4)}$$

where
  $C_{m,n}$ is an LLR from check node m to variable node n,
  $V_{n',m}$ is a set of LLRs from all variable nodes (except for variable node n) connected to check node m, and
  $f_c$ denotes a decoding function for the check nodes.

As shown in equations (3) and (4) and FIG. 5, processing unit 520 may compute and pass LLRs $V_{n,m}$ from variable nodes to check nodes. Processing unit 540 may compute and pass LLRs $C_{m,n}$ from check nodes to variable nodes. The LLRs passed between processing units 520 and 540 may also be referred to as messages. De-permutation unit 550 provides a set of LLRs $C_{m',n}$ for each variable node m. Permutation unit 530 provides a set of LLRs $V_{n',m}$ for each check node n. Functions $f_v$ and $f_c$ may be obtained from various publicly available technical papers and are not described herein for simplicity.

The decoding by processing units 520 and 540 may be iterated K times, where K may be a configurable value that may be selected as described below. The decoding results may be more reliable after each iteration. After all K decoding iterations are completed, a detector 560 may receive the final LLRs from processing unit 520, make a hard decision on each LLR, and provide decoded bits.

A Turbo decoder or an LDPC decoder (e.g., as shown in FIG. 4 or 5) may perform a number of iterations to decode a data packet. Link performance typically improves with the number of decoding iterations. A data packet may thus be decoded in worse SNR conditions if more decoding iterations are performed. However, this improvement tapers off beyond a certain number of decoding iterations.

Figure 6A:
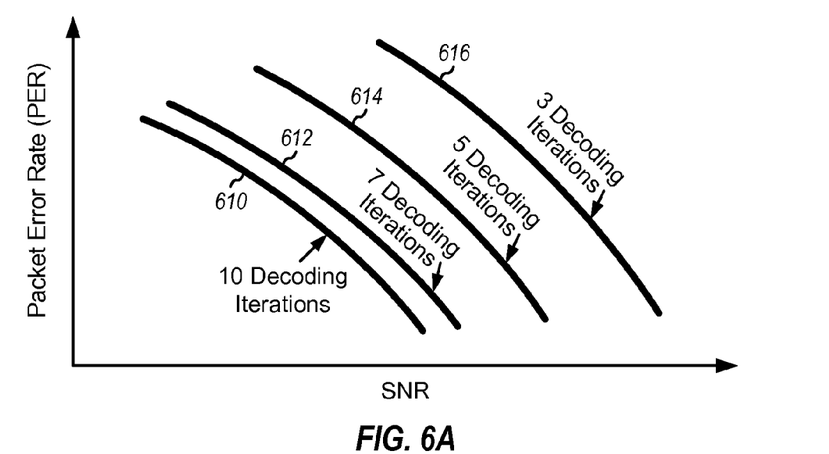
FIGS. 6A and 6B show link performance versus numbers of decoding iterations.

FIG. 6A shows plots of link performance for different numbers of decoding iterations. The horizontal axis represents SNR, and the vertical axis represents packet error rate (PER). Curves 610, 612, 614 and 616 show PER versus SNR for 10, 7, 5 and 3 decoding iterations, respectively. As shown in FIG. 6A, link performance progressively degrades for progressively fewer decoding iterations. Improvement in link performance asymptotically reaches a theoretical limit after a certain number of decoding iterations.

Figure 6B:
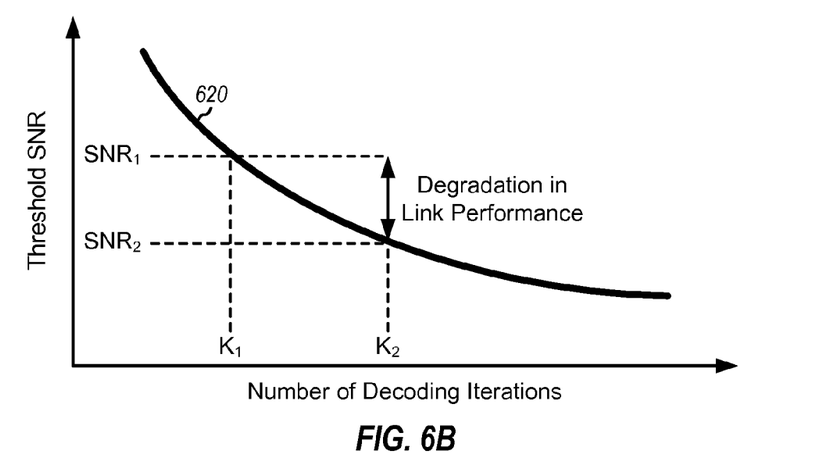

FIG. 6B shows a plot 620 of threshold SNR versus number of decoding iterations for a given PER. Plot 620 may be obtained by (i) determining the SNR values in curves 610, 612, 614 and 616 in FIG. 6A at this PER and (ii) plotting these SNR values versus number of decoding iterations. As shown in FIG. 6B, the threshold SNR is higher for fewer decoding iterations and asymptotically reaches a certain minimum SNR. In general, a plot of threshold SNR versus number of decoding iterations may be obtained by computer simulation, empirical measurement, etc. The plot may be dependent on various factors such as packet size, coding scheme, code rate, modulation format, etc.

In an aspect, the number of decoding iterations may be selected based on a tradeoff between decoder throughput and link performance. In general, the number of decoding iterations may be selected based on one or more of the following:

Packet size—fewer decoding iterations for larger data packet, and vice versa,

Number of packets—fewer decoding iterations for more packets, and vice versa,

Data rate—fewer decoding iterations for higher data rate, and vice versa,

SNR—fewer decoding iterations for higher SNR, and vice versa,

Code rate—fewer decoding iterations for higher code rate, and vice versa,

Modulation format—fewer decoding iterations for modulation format of higher order, and vice versa, HARQ transmission index—fewer decoding iterations for later HARQ transmission index, and vice versa, Number of transmitters sending data—fewer decoding iterations for more transmitters sending data to a receiver, and vice versa, and Battery power—fewer decoding iterations for low battery, and vice versa.

The number of decoding iterations may also be selected based on other criteria.

In one design, a receiver may perform fewer decoding iterations if it is receiving a large amount of data and may perform more decoding iterations if it is receiving a small amount of data. The amount of data to receive may be equal to the number of packets times the size of each packet. If only one packet is being received, then the amount of data may be equal to the packet size. The amount of data may be directly related to data rate. In any case, this design may be beneficial since receivers with high data rates typically observe good SNR conditions. Hence, some loss in link performance due to fewer decoding iterations may be acceptable. Furthermore, if the receivers have limited decoder processing capability, then the achievable data rate may be constrained by processing capability at the receivers instead of SNR, and higher data rate may be supported by performing fewer iterations. Conversely, for receivers observing poor SNR conditions, it may be more important to obtain the best possible link performance. Furthermore, these receivers may have low data rates due to poor SNR conditions and may be able to perform more decoding iterations with the limited decoder processing capability. This design may be beneficial for the system as a whole since good link performance for weak receivers may be important to achieve higher system throughput.

In one design, the number of decoding iterations to be performed by a receiver may be determined based on packet size. This design may assume that a predetermined number of data packets (e.g., one data packet) is sent to the receiver. In one design, the packet size may be compared against one or more thresholds, and the number of decoding iterations may be determined based on the comparison results. For example, $N_1$ decoding iterations may be performed if the packet size is less than $S_1$, $N_2$ decoding iterations may be performed if the packet size is between $S_1$ and $S_2$, $N_3$ decoding iterations may be performed if the packet size is between $S_2$ and $S_3$, etc., where $N_1 > N_2 > N_3 > \ldots$, and $S_1 < S_2 < S_3 < \ldots$ In another design, a look-up table may store the number of decoding iterations for each supported packet size. The packet size for the receiver may then be provided to the look-up table, which may return the number of decoding iterations to perform.

Figure 7:
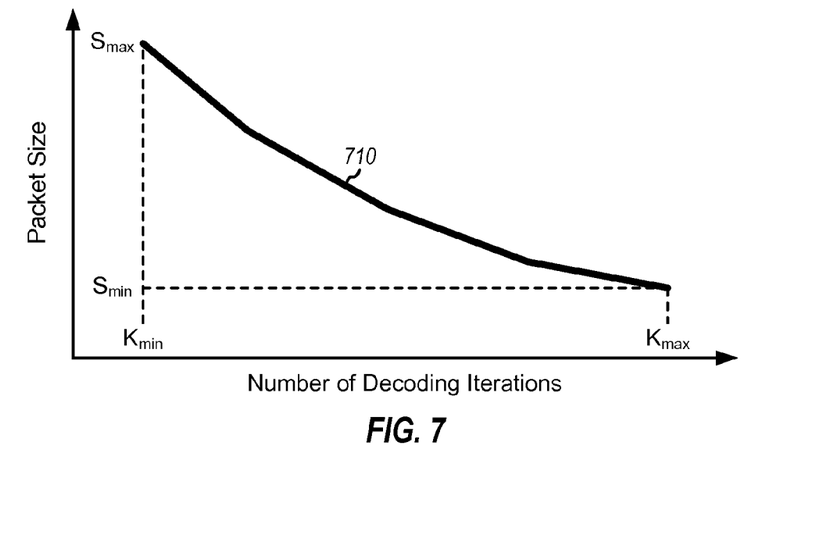
FIG. 7 shows packet size versus number of decoding iterations.

FIG. 7 shows an exemplary plot 710 of packet size versus number of decoding iterations. The minimum number of decoding iterations $K_{min}$ may be performed for the largest packet size $S_{max}$, and the maximum number of decoding iterations $K_{max}$ may be performed for the smallest packet size $S_{min}$. Progressively more decoding iterations may be performed for progressively smaller packet size.

In general, the number of decoding iterations to perform for each data packet may be determined based on various factors such as packet size, decoding processing capability, desired decoding delay, desired link performance, etc. In one design, a fixed set of thresholds or a fixed look-up table may be defined to provide good performance for the receiver and may be used to select the number of decoding iterations versus packet size. In another design, different sets of thresholds or different look-up tables may be defined for different operating conditions, e.g., different types of data being received, different battery conditions, etc.

The receiver may receive a data packet of a particular size S and may perform K decoding iterations, which may be selected based on the packet size S. In one design, the receiver may perform K decoding iterations and then terminate decoding. In another design, the receiver may check to see if the data packet is decoded correctly after each iteration, e.g., following a certain minimum number of decoding iterations. The receiver may terminate decoding early if the data packet is decoded correctly prior to K iterations and may terminate after K iterations regardless of the decoding result. The receiver may thus perform up to K decoding iterations for the data packet and may or may not terminate early.

For HARQ, a transmitter may send one or more transmissions of a data packet until the packet is decoded correctly by a receiver, or the maximum number of transmissions has been sent, or some other termination condition is encountered. If the receiver is unable to correctly decode the data packet after K iterations, then the receiver may save decoding results (e.g., the latest LLRs) for the data packet. The receiver may use the saved decoding results to decode the data packet after receiving the next transmission of the data packet. Thus, even if the receiver is unable to correctly decode the data packet (possibly due to performing fewer iterations), the receiver can make use of the decoding results from a prior transmission of the data packet for subsequent decoding attempts.

As shown in FIGS. 6A and 6B, the link performance may be worse for fewer decoding iterations. For example, the threshold SNR for a data packet may be $SNR_1$ with $K_1$ decoding iterations and may be $SNR_2$ with $K_2$ decoding iteration, where $SNR_1 > SNR_2$ and $K_1 < K_2$. The degradation in link performance may be given as $SNR_1 - SNR_2$ due to performing $K_1$ decoding iterations instead of $K_2$ decoding iterations.

In another aspect, a base station may employ a receiver that performs a configurable number of decoding iterations for data transmission on the uplink. The base station may select a transport format for a UE based on an expected degradation in link performance due to the base station performing a selected number of decoding iterations for a data packet received from the UE. The base station may estimate the amount of degradation in link performance for the selected number of decoding iterations. The base station may then select the transport format such that the data packet can be decoded correctly with the target PER after the selected number of decoding iterations.

In one design, the base station may have a look-up table of transport format versus received SNR. This look-up table may be generated based on an assumption of $K_{max}$ decoding iterations. The base station may plan to perform K decoding iterations, where $K < K_{max}$, and may determine the degradation in link performance to be Q dB for K decoding iterations. The base station may measure a received SNR of $X_{rx}$ dB for the UE and may compute an effective SNR as $X_{eff} = X_{rx} - Q$. The base station may then select a transport format by applying the effective SNR $X_{eff}$ (instead of the received SNR $X_{rx}$) to the look-up table. The base station may also select a transport format to account for the expected degradation in link performance due to fewer decoding iterations in other manners.

In yet another aspect, a UE may employ a receiver that performs a configurable number of decoding iterations for data transmission on the downlink. The UE may report CQI information based on an expected degradation in link performance due to the UE performing a selected number of decoding iterations for a data packet received from a base station. The UE may estimate the amount of degradation in link performance for the selected number of decoding iterations. The UE may then report a worse CQI than if it were performing more decoding iterations.

In one design, the UE may have a look-up table of CQI levels versus received SNR. In general, CQI information may comprise a quantized SNR, a transport format, or some other information indicative of received signal quality. The CQI levels may correspond to quantized SNR values or some other information. The look-up table may be generated based on an assumption of $K_{max}$ decoding iterations. The UE may plan to perform K decoding iterations, where $K < K_{max}$, and may determine the degradation in link performance to be Q dB for K decoding iterations. The UE may measure a received SNR of $X_{rx}$ dB for the base station and may compute an effective SNR as $X_{eff} = X_{rx} - Q$. The UE may then apply the effective SNR $X_{eff}$ (instead of the received SNR X) to the look-up table. The UE may then report CQI information obtained with the effective SNR $X_{eff}$ to the base station. The base station may receive the CQI information from the UE and may select a transport format for the UE based on the CQI information. The base station may thus select the transport format such that a data packet can be decoded correctly by the UE with the target PER after K decoding iterations.

The UE may also report CQI information to account for the expected degradation in link performance due to fewer decoding iterations in other manners. For example, the UE may select a transport format based on the received SNR for the base station and the selected number of decoding iterations, in a manner similar to that described above for the base station. The UE may then report the transport format as CQI information.

In yet another aspect, a station (e.g., a UE or a base station) may provide the number of decoding iterations it plans to use for different packet sizes (or some other parameter values) as part of its capability. In one design, a UE may report the number of decoding iterations it plans to use for different packet sizes (or some other parameter values) as part of its capability to a base station. The base station may use the UE capability to select transport formats for the UE, as described above. In another design, a base station may broadcast or convey the number of decoding iterations it plans to use for different packet sizes (or some other parameter values) as part of its capability. A UE may use the base station capability to report CQI information to the base station, as described above.

Figure 8:
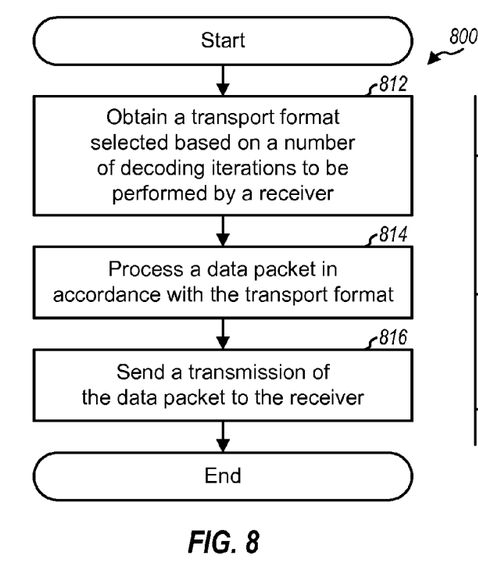
FIG. 8 shows a process for transmitting data.

FIG. 8 shows a design of a process 800 for transmitting data in a communication system. Process 800 may be performed by a transmitter, which may be a base station, a UE, or some other entity. The transmitter may obtain a transport format selected based on a number of decoding iterations to be performed by a receiver (block 812). The transmitter may process a data packet in accordance with the transport format (block 814) and may send a transmission of the data packet to the receiver (block 816).

In one design, the transmitter may be part of a base station. The base station may receive CQI information from a UE, which may determine the CQI information based on the number of decoding iterations to be performed by the UE. The base station may select the transport format for the data packet based on the CQI information. Alternatively, the UE may generate and send CQI information in the normal manner, e.g., based on an assumption of the maximum number of decoding iterations being performed by the UE. The base station may then select the transport format based on the CQI information and the expected degradation in link performance due to the number of decoding iterations to be performed by the UE.

In another design, the transmitter may be part of a UE. The UE may receive the transport format from a base station, which may select the transport format based on the number of decoding iterations to be performed by the base station. Alternatively, the base station may select the transport format in the normal manner, e.g., based on an assumption of the maximum number of decoding iterations being performed by the base station. The UE may then modify the transport format based on the expected degradation in link performance due to the number of decoding iterations to be performed by the base station.

In one design, the transmitter may obtain capability of the receiver. The receiver capability may comprise a particular number of decoding iterations for each of multiple parameter values, e.g., for each range of packet sizes. The transmitter may determine at least one parameter for data transmission to the receiver based on the receiver capability. For example, the transmitter may use the receiver capability to select or modify the transport format for the data packet.

Figure 9:
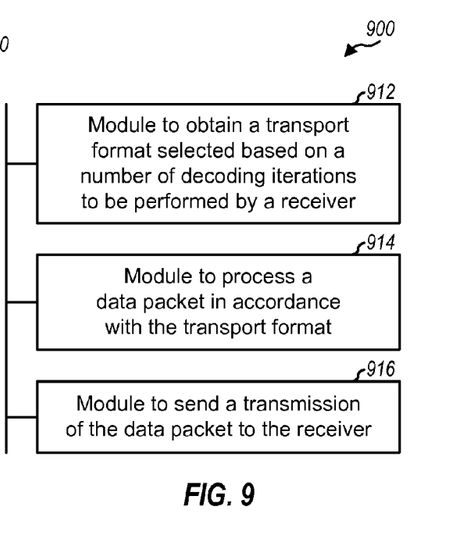
FIG. 9 shows an apparatus for transmitting data.

FIG. 9 shows a design of an apparatus 900 for transmitting data in a communication system. Apparatus 900 includes a module 912 to obtain a transport format selected based on a number of decoding iterations to be performed by a receiver, a module 914 to process a data packet in accordance with the transport format, and a module 916 to send a transmission of the data packet to the receiver.

Figure 10:
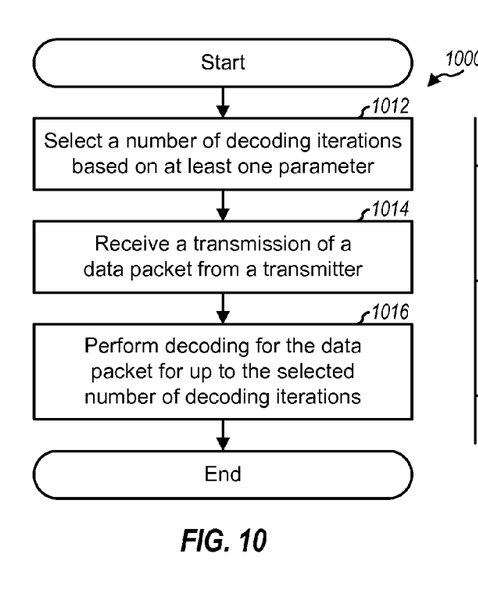
FIG. 10 shows a process for receiving data.

FIG. 10 shows a design of a process 1000 for receiving data in a communication system. Process 1000 may be performed by a receiver, which may be a UE, a base station, or some other entity. The receiver may select a number of decoding iterations based on at least one parameter, e.g., packet size, number of packets, data rate, SNR, code rate, modulation format, HARQ transmission index, number of transmitters sending data, available battery power, etc. (block 1012). In one design, a plurality of different numbers of decoding iterations may be associated with a plurality of ranges of packet sizes. The receiver may select one of the plurality of different numbers of decoding iterations based on packet size.

The receiver may receive a transmission of a data packet sent by a transmitter in accordance with a transport format determined based on the selected number of decoding iterations (block 1014). The receiver may perform decoding (e.g., Turbo decoding, LDPC decoding, convolutional decoding, etc.) for the data packet for up to the selected number of decoding iterations (block 1016). In one design of block 1016, the receiver may perform decoding without early termination. The receiver may perform decoding for the selected number of decoding iterations and may terminate decoding after completing the selected number of decoding iterations. In another design of block 1016, the receiver may perform decoding with early termination. The receiver may determine whether the data packet is decoded correctly after each decoding iteration, e.g., following a certain minimum number of decoding iterations. The receiver may terminate decoding if the data packet is decoded correctly or if the selected number of decoding iterations has been performed.

In one design, the receiver may save decoding results for the data packet if it is not decoded correctly after completing the selected number of decoding iterations. The receiver may thereafter receive another transmission of the data packet. The receiver may then perform decoding for the data packet based on the received transmission and the saved decoding results for the data packet.

In one design, the receiver may be part of a UE. The UE may determine CQI information based on the selected number of decoding iterations. For example, the UE may determine an expected degradation in link performance corresponding to the selected number of decoding iterations, determine a received SNR for a base station, and determine CQI information based on the received SNR and the expected degradation in link performance. The UE may send the CQI information to the base station and may thereafter receive the transmission of the data packet, which may be sent by the base station in accordance with the transport format selected based on the CQI information.

In another design, the receiver may be part of a base station. The base station may select a transport format for the data packet based on the selected number of decoding iterations. For example, the base station may determine an expected degradation in link performance corresponding to the selected number of decoding iterations, determine a received SNR for a UE, and select the transport format based on the received SNR and the expected degradation in link performance. The base station may send the transport format to the UE and may thereafter receive the transmission of the data packet, which may be sent by the UE in accordance with the transport format.

In one design, the UE may determine UE capability comprising a particular number of decoding iterations for each of multiple parameter values. For example, the UE capability may comprise a particular number of decoding iterations for each of multiple packet sizes. The UE may send the UE capability to the base station, which may select the transport format based on the UE capability.

In another design, the base station may determine base station capability comprising a particular number of decoding iterations for each of multiple parameter values. For example, the base station capability may comprise a particular number of decoding iterations for each of multiple packet sizes. The base station may send (e.g., broadcast) the base station capability to at least one UE, which may generate CQI information based on the base station capability.

Figure 11:
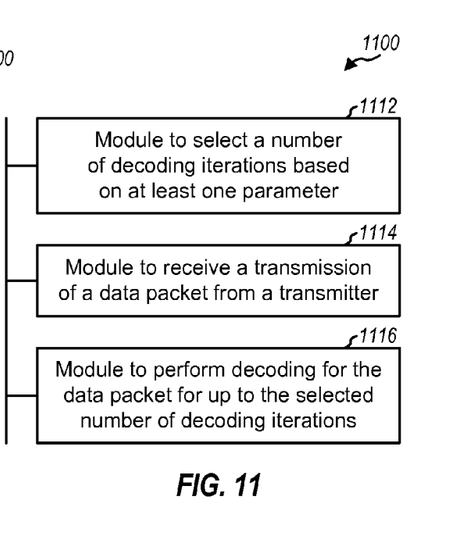
FIG. 11 shows an apparatus for receiving data.

FIG. 11 shows a design of an apparatus 1100 for receiving data in a communication system. Apparatus 1100 includes a module 1112 to select a number of decoding iterations based on at least one parameter, a module 1114 to receive a transmission of a data packet from a transmitter, and a module 1116 to perform decoding for the data packet for up to the selected number of decoding iterations.

The modules in FIGS. 9 and 11 may comprise processors, electronics devices, hardware devices, electronics components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of receiving data in a communication system, comprising:
selecting a number of decoding iterations based on at least one parameter;
performing decoding for a data packet for up to the selected number of decoding iterations;
saving decoding results for the data packet based on whether the data packet is decoded correctly after completing the selected number of decoding iterations;
receiving another transmission of the data packet;
performing decoding for the data packet based on the received transmission and the saved decoding results for the data packet;
determining an expected degradation in link performance corresponding to the selected number of decoding iterations;
determining a received signal-to-noise ratio (SNR); and
determining channel quality indicator (CQI) information based on the received SNR and the expected degradation in link performance.

2. The method of claim 1, further comprising:
receiving a transmission of the data packet sent by a transmitter in accordance with a transport format determined based on the selected number of decoding iterations.

3. The method of claim 1, wherein the at least one parameter comprises at least one of packet size, number of packets, data rate, signal-to-noise ratio (SNR), code rate, modulation format, HARQ transmission index, number of transmitters sending data, and available battery power.

4. The method of claim 1, wherein a plurality of different numbers of decoding iterations are associated with a plurality of ranges of packet sizes, and wherein the selecting the number of decoding iterations comprises selecting one of the plurality of different numbers of decoding iterations based on the size of the data packet.

5. The method of claim 1, wherein the performing decoding comprises
performing Turbo decoding or low density parity check (LDPC) decoding for the data packet for up to the selected number of decoding iterations.

6. The method of claim 1, wherein the performing decoding comprises
performing decoding for the data packet for the selected number of decoding iterations, and
terminating decoding of the data packet after completing the selected number of decoding iterations.

7. The method of claim 1, wherein the performing decoding comprises
determining whether the data packet is decoded correctly after each decoding iteration following a minimum number of decoding iterations, and
terminating decoding of the data packet if the data packet is decoded correctly or if the selected number of decoding iterations has been performed.

8. The method of claim 1, further comprising:
determining channel quality indicator (CQI) information based on the selected number of decoding iterations;
sending the CQI information to a transmitter station; and
receiving a transmission of the data packet sent by the transmitter station in accordance with a transport format selected based on the CQI information.

9. A method of receiving data in a communication system, comprising:
selecting a number of decoding iterations based on at least one parameter;
performing decoding for a data packet for up to the selected number of decoding iterations;

saving decoding results for the data packet based on whether the data packet is decoded correctly after completing the selected number of decoding iterations;
receiving another transmission of the data packet;
performing decoding for the data packet based on the received transmission and the saved decoding results for the data packet;
selecting a transport format for the data packet based on the selected number of decoding iterations;
sending the transport format to a user equipment (UE); and
receiving a transmission of the data packet sent by the UE in accordance with the transport format.

10. A method of receiving data in a communication system, comprising:
selecting a number of decoding iterations based on at least one parameter;
performing decoding for a data packet for up to the selected number of decoding iterations;
saving decoding results for the data packet based on whether the data packet is decoded correctly after completing the selected number of decoding iterations;
receiving another transmission of the data packet;
performing decoding for the data packet based on the received transmission and the saved decoding results for the data packet;
determining an expected degradation in link performance corresponding to the selected number of decoding iterations,
determining a received signal-to-noise ratio (SNR), and
selecting a transport format for the data packet based on the received SNR and the expected degradation in link performance.

11. A method of receiving data in a communication system, comprising:
selecting a number of decoding iterations based on at least one parameter;
performing decoding for a data packet for up to the selected number of decoding iterations;
saving decoding results for the data packet based on whether the data packet is decoded correctly after completing the selected number of decoding iterations;
receiving another transmission of the data packet;
performing decoding for the data packet based on the received transmission and the saved decoding results for the data packet;
determining user equipment (UE) capability comprising a particular number of decoding iterations for each of multiple parameter values; and
sending the UE capability to a base station.

12. The method of claim 11, wherein the UE capability comprises a particular number of decoding iterations for each of multiple packet sizes.

13. A method of receiving data in a communication system, comprising:
selecting a number of decoding iterations based on at least one parameter;
performing decoding for a data packet for up to the selected number of decoding iterations;
saving decoding results for the data packet based on whether the data packet is decoded correctly after completing the selected number of decoding iterations;
receiving another transmission of the data packet;
performing decoding for the data packet based on the received transmission and the saved decoding results for the data packet;
determining base station capability comprising a particular number of decoding iterations for each of multiple parameter values; and
sending the base station capability to at least one user equipment (UE).

14. An apparatus for receiving data in a communication system, comprising:
means for selecting a number of decoding iterations based on at least one parameter;
means for performing decoding for a data packet for up to the selected number of decoding iterations;
means for saving decoding results for the data packet based on whether the data packet is decoded correctly after completing the selected number of decoding iterations;
means for sending capability of a receiver to a transmitter, the receiver capability comprising a particular number of decoding iterations for each of multiple parameter values;
means for determining channel quality indicator (CQI) information based on the selected number of decoding iterations;
means for sending the CQI information to a base station; and
means for receiving a transmission of the data packet sent by the base station in accordance with a transport format selected based on the CQI information.

15. An apparatus for receiving data in a communication system, comprising:
means for selecting a number of decoding iterations based on at least one parameter;
means for performing decoding for a data packet for up to the selected number of decoding iterations;
means for saving decoding results for the data packet based on whether the data packet is decoded correctly after completing the selected number of decoding iterations;
means for sending capability of a receiver to a transmitter, the receiver capability comprising a particular number of decoding iterations for each of multiple parameter values;
means for selecting a transport format for the data packet based on the selected number of decoding iterations;
means for sending the transport format to a user equipment (UE); and
means for receiving a transmission of the data packet sent by the UE in accordance with the transport format.

16. A method of transmitting data in a communication system, comprising:
processing a data packet in accordance with a transport format selected based on a number of decoding iterations to be performed by a receiver;
sending a transmission of the data packet to the receiver;
receiving the transport format selected by a base station based on the number of decoding iterations to be performed by the receiver at the base station;
receiving channel quality indicator (CQI) information determined by a user equipment (UE) based on the number of decoding iterations to be performed by the receiver at the UE; and
selecting the transport format for the data packet based on the CQI information.

17. A method of transmitting data in a communication system, comprising:
processing a data packet in accordance with a transport format selected based on a number of decoding iterations to be performed by a receiver;
sending a transmission of the data packet to the receiver;

receiving the transport format selected by a base station based on the number of decoding iterations to be performed by the receiver at the base station;

obtaining capability of the receiver, the receiver capability comprising a particular number of decoding iterations for each of multiple parameter values; and determining at least one parameter for data transmission to the receiver based on the receiver capability.

18. An apparatus for transmitting data in a communication system, comprising:

means for processing a data packet in accordance with a transport format selected based on a number of decoding iterations to be performed by a receiver;

means for sending a transmission of the data packet to the receiver;

means for receiving the transport format selected by a base station based on the number of decoding iterations to be performed by the receiver at the base station;

means for receiving channel quality indicator (CQI) information determined by a user equipment (UE) based on the number of decoding iterations to be performed by the receiver at the UE; and means for selecting the transport format for the data packet based on the CQI information.

19. An apparatus for transmitting data in a communication system, comprising:

means for processing a data packet in accordance with a transport format selected based on a number of decoding iterations to be performed by a receiver;

means for sending a transmission of the data packet to the receiver;

means for receiving the transport format selected by a base station based on the number of decoding iterations to be performed by the receiver at the base station;

means for obtaining capability of the receiver, the receiver capability comprising a particular number of decoding iterations for each of multiple parameter values; and means for determining at least one parameter for data transmission to the receiver based on the receiver capability.

20. A method of receiving data in a communication system, comprising:

selecting a number of decoding iterations based on at least one parameter;

performing decoding for a data packet for up to the selected number of decoding iterations;

saving decoding results for the data packet based on whether the data packet is decoded correctly after completing the selected number of decoding iterations;

receiving another transmission of the data packet; and performing decoding for the data packet based on the received transmission and the saved decoding results for the data packet, wherein the at least one parameter is a hybrid automatic retransmission (HARQ) transmission index, wherein the number of decoding iterations selected is lower for later indexes and higher for earlier indexes.

21. A method of receiving data in a communication system, comprising:

selecting a number of decoding iterations based on at least one parameter;

performing decoding for a data packet for up to the selected number of decoding iterations;

saving decoding results for the data packet based on whether the data packet is decoded correctly after completing the selected number of decoding iterations;

receiving another transmission of the data packet; and performing decoding for the data packet based on the received transmission and the saved decoding results for the data packet, wherein the at least one parameter is a modulation format to be used for transmission to the receiver, wherein the number of decoding iterations selected is lower for modulation formats of a higher order and higher for modulation formats of a lower order.

\* \* \* \* \*